US012660059B2

(12) United States Patent
Yang et al.

(10) Patent No.: US 12,660,059 B2
(45) Date of Patent: Jun. 16, 2026

(54) SYNCHRONIZATION SIGNAL TRANSMISSION METHOD AND BACKLIGHT SYSTEM

(71) Applicant: Silergy Semiconductor Technology (Hangzhou) LTD, Hangzhou (CN)

(72) Inventors: Yuanyu Yang, Hangzhou (CN); Jianxin Wang, Hangzhou (CN); Xiaoqiang Xu, Hangzhou (CN)

(73) Assignee: Silergy Semiconductor Technology (Hangzhou) LTD., Hangzhou (CN)

( * ) Notice: Subject to any disclaimer, the term of this patent is extended or adjusted under 35 U.S.C. 154(b) by 31 days.

(21) Appl. No.: 18/764,848

(22) Filed: Jul. 5, 2024

(65) Prior Publication Data

US 2025/0024569 A1 Jan. 16, 2025

(30) Foreign Application Priority Data

Jul. 12, 2023 (CN) ......................... 202310855200.4

(51) Int. Cl.
*H05B 45/46* (2020.01)
*H05B 45/305* (2020.01)
*H05B 45/34* (2020.01)

(52) U.S. Cl.
CPC ........... *H05B 45/305* (2020.01); *H05B 45/34* (2020.01)

(58) Field of Classification Search
CPC ........ H05B 45/20; H05B 45/46; H05B 45/48; H05B 45/56; H05B 45/305; H05B 45/375; H05B 45/395
See application file for complete search history.

(56) References Cited

U.S. PATENT DOCUMENTS

| | | | | |
|---|---|---|---|---|
| 7,508,141 | B2 * | 3/2009 | Wong | H05B 47/155 315/185 S |
| 8,492,983 | B1 * | 7/2013 | Berg | H05B 45/00 315/307 |
| 10,165,655 | B2 * | 12/2018 | Niebert | H05B 47/18 |
| 10,356,824 | B2 | 7/2019 | Qiao et al. | |
| 10,368,423 | B2 * | 7/2019 | Sturm | H05B 47/18 |
| 10,548,203 | B2 * | 1/2020 | Neumann | H04L 1/1671 |
| 11,295,907 | B2 * | 4/2022 | Lee | H01H 13/14 |
| 2014/0333207 | A1 * | 11/2014 | Saes | H05B 47/18 315/132 |
| 2023/0179668 | A1 | 6/2023 | Lin et al. | |

* cited by examiner

*Primary Examiner* — Tung X Le

(57) ABSTRACT

A synchronization signal transmission method employed by a backlight system, the backlight system having a master device, a plurality of slave devices, and a plurality of LED strings, can include: injecting a synchronization signal into a power supply voltage, in order to generate a first signal; inputting the first signal to a power supply port of each slave device, in order to simultaneously transmit the synchronization signal to each slave device, where each slave device is configured to drive at least one LED string; and receiving the first signal from the power supply port of each slave device for synchronization operation.

13 Claims, 5 Drawing Sheets

SYNCHRONIZATION SIGNAL TRANSMISSION METHOD AND BACKLIGHT SYSTEM

RELATED APPLICATIONS

This application claims the benefit of Chinese Patent Application No. 202310855200.4, filed on Jul. 12, 2023, which is incorporated herein by reference in its entirety.

FIELD OF THE INVENTION

The present invention generally relates to the field of communications, and more particularly, to synchronization signal transmission methods and backlight systems.

BACKGROUND

Referring now to FIG. 1, shown is a schematic diagram of an example backlight system. In this particular example, the backlight system can include a master device and slave devices IC1-ICn coupled in series. Each slave device can include power supply port Vcc that may receive power supply voltage signal VIN, ground potential port GND that can be coupled to the ground potential, and synchronization port VSYNC that may receive synchronization signal VSYNC sent by the master device.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
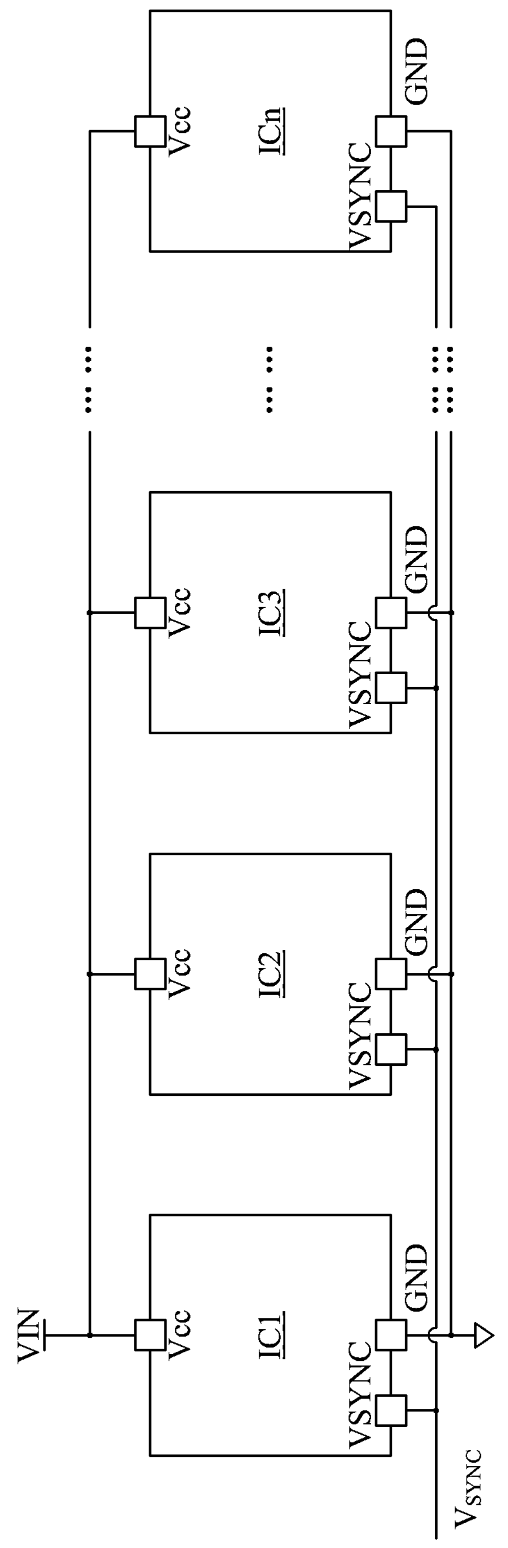
FIG. 1 is a schematic diagram of an example backlight system.

It is desirable to realize all of the wiring of the slave devices in the example backlight system of FIG. 1 on a single-layer aluminum substrate, in order to reduce the cost. However, after the wiring of the power supply port and the ground potential port is completed on the single-layer aluminum substrate, the synchronization port may not be wired on the same layer, and can be blocked by the wiring of the power supply port and the ground potential port. As a result, it may not be possible to realize all wiring of the slave devices in the backlight system in this example with the single-layer aluminum substrate. In order to solve such problems, jumpers or double-layer wiring may typically be utilized, which can greatly increase the cost.

Figure 2:
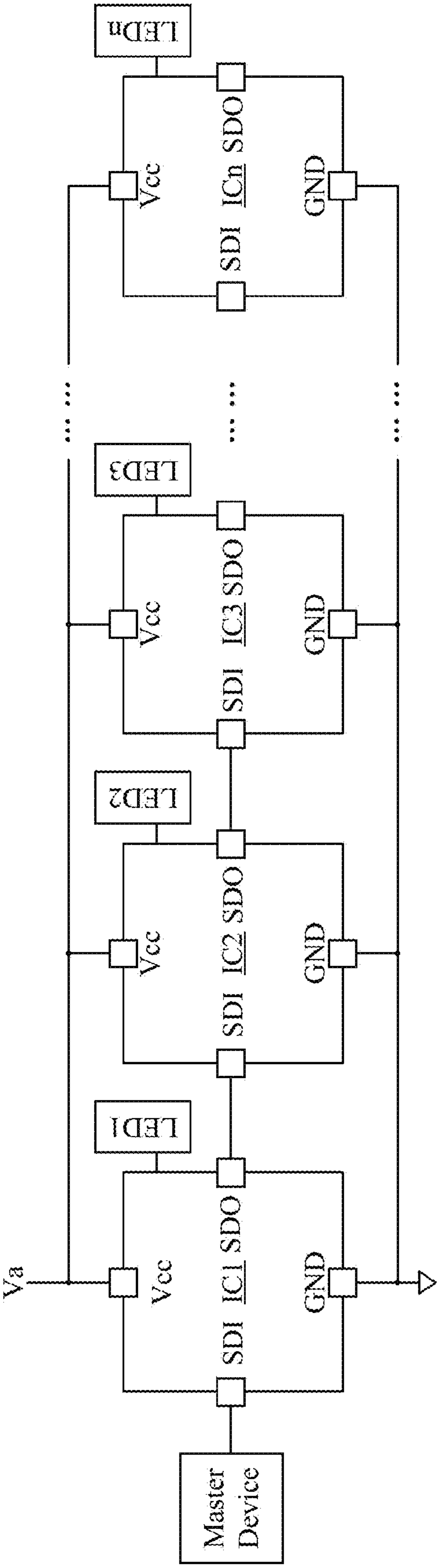
FIG. 2 is a schematic diagram of an example backlight system, in accordance with embodiments of the present invention.

Referring now to FIG. 2, shown is a schematic diagram of an example backlight system, in accordance with embodiments of the present invention. In this particular example, the backlight system can include a master device, n slave device IC1-ICn and light-emitting diode (LED) strings, where n is a positive integer. For example, the master device and n slave device IC1-ICn can connect in series in turn, and each slave device may drive at least one LED string. For example, each slave device can include input port SDI and output port SDO. Input port SDI of slave device IC1 can connect to the output port of the master device, and input ports SDI of slave device IC2 to nth slave device ICn can respectively connect to output port SDO of the previous slave device. Each slave device can also include power supply port Vcc, and power supply port Vcc of each slave device may receive signal Va generated by injecting synchronization signal $V_{SYNC}$ into power supply voltage Vin, in order to simultaneously transmit synchronization signal $V_{SYNC}$ to each slave device.

Each slave device may receive signal Va from its own power supply port Vcc for synchronization operation. In this particular example, synchronization signal $V_{SYNC}$ can be transmitted by the master device. In another example, synchronization signal $V_{SYNC}$ can be transmitted by an external circuit, where the external circuit can be any circuitry other than the master device and the slave devices. Synchronization signal $V_{SYNC}$ can be a periodic signal. In one example, the period of synchronization signal $V_{SYNC}$ may be fixed, while in another example, the period of synchronization signal $V_{SYNC}$ can be adjusted. That is, the period of synchronization signal $V_{SYNC}$ can be changed in certain embodiments.

Figure 3:
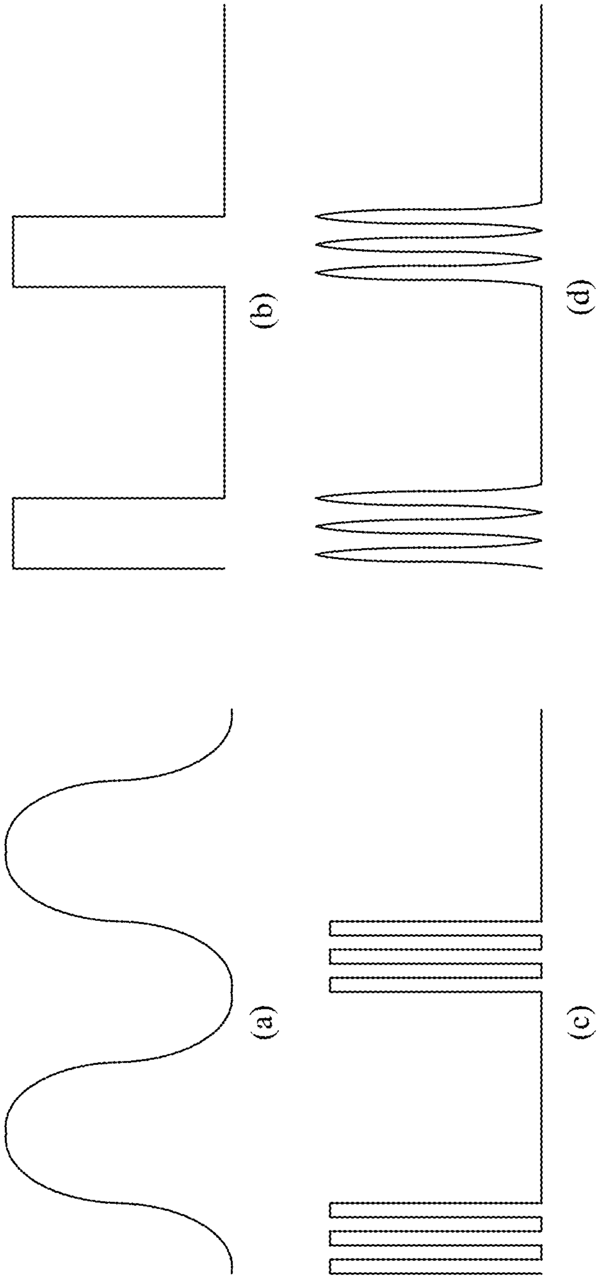
FIG. 3 is a waveform diagram of an example a synchronization signal, in accordance with embodiments of the present invention.

Referring now to FIG. 3, shown is a waveform diagram of an example a synchronization signal, in accordance with embodiments of the present invention. In one embodiment, synchronization signal $V_{SYNC}$ can be a low-frequency signal, e.g., a trapezoidal wave, a sine wave (as shown in (a) of FIG. 3), a rectangular wave (as shown in (b) of FIG. 3), a triangular wave, and so on. In another example, synchronization signal $V_{SYNC}$ may be a high-frequency signal, as shown in (c) and (d) of FIG. 3. In this example, power supply voltage Vin can be generated by the power supply circuit, and may be a relatively stable value, such as a fixed value. Each slave device can also include ground potential port GND, which can connect to the ground potential. In this example, each slave device may not only realize power supply, but also complete the transmission of the synchronization signal through the power supply port, thereby reducing the synchronization port of each slave device and saving the wiring of the synchronization port on the aluminum substrate.

In particular embodiments, synchronization signal $V_{SYNC}$ can be injected into power supply voltage Vin to generate signal Va. Also, signal Va can be input to power supply port Vcc of each slave device, such that synchronization signal $V_{SYNC}$ is transmitted to each slave device through each power supply port Vcc. Further, each slave device may receive signal Va from its own power supply port Vcc for synchronization operation. In this example, signal Va received by power supply port Vcc of the slave device can contain power supply voltage Vin, so the slave device can be powered. Also, signal Va received by power supply port Vcc of the slave device may also contain synchronization signal $V_{SYNC}$, such that synchronization signal $V_{SYNC}$ is transmitted to the slave device through power supply port Vcc.

In a backlight system of particular embodiments, synchronization signal $V_{SYNC}$ may have different functions. In one example, synchronization signal $V_{SYNC}$ can be a reference moment when the brightness of an LED string needs to be changed, or when an LED brightness signal starts to take effect. For example, when the brightness of an LED string needs to be changed, the LED brightness signal can accordingly change, and the slave device corresponding to the LED string can change the brightness of the LED string after delaying for a first time (e.g., greater than or equal to zero) from the rising edge or falling edge of the pulse of the synchronization signal.

In another example, synchronization signal $V_{SYNC}$ can be phase-locked and frequency-doubled to generate an LED current control signal synchronized with synchronization signal $V_{SYNC}$ to drive the LED string. For example, the slave device can generate the frequency of the LED current control signal for driving the LED string according to the frequency of synchronization signal $V_{SYNC}$, in order to improve the accuracy of the LED current in one period of the synchronization signal. For example, the frequency of the LED current control signal can be equal to the product of a first coefficient (e.g., a positive integer) and frequency of synchronization signal $V_{SYNC}$.

Further, each slave device may receive signal Va through its own power supply port Vcc, and can separate the first synchronization signal representing the synchronization signal from signal Va, or a divided voltage signal of signal Va. For example, each slave device can include a synchronization signal restoration module and a control module. The synchronization signal restoration module of the slave device can generate the first synchronization signal representing synchronization signal $V_{SYNC}$ according to signal Va, or a divided voltage signal of signal Va received by power supply port Vcc of the slave device. Also, the control module may receive the first synchronization signal, and can perform a synchronization operation according to the first synchronization signal.

In particular embodiments, since power supply voltage Vin is a power signal and the synchronization signal is a control signal, it may not be possible to inject synchronization signal $V_{SYNC}$ into power supply voltage Vin by using a simple adder. In this example, power supply voltage Vin can be generated by the power supply circuit, and synchronization signal $V_{SYNC}$ may be introduced into the feedback loop of the output voltage control circuit of the power supply circuit (e.g., the synchronization signal is input to a feedback pin of the control chip of the power supply circuit), in order to correct the output voltage of the power supply circuit, such that the output voltage of the power supply circuit can be signal Va. Injecting synchronization signal $V_{SYNC}$ into power supply voltage Vin can be realized in any suitable way to generate signal Va in certain embodiments.

Figure 4:
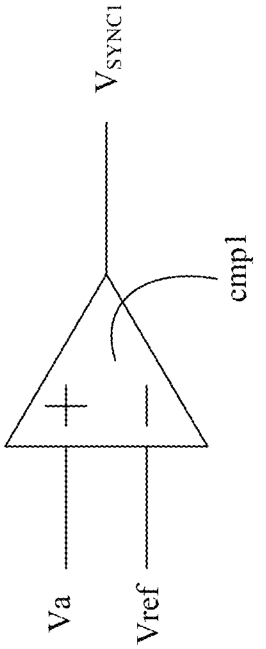
FIG. 4 is a schematic diagram of an example a synchronization signal restoration module, in accordance with embodiments of the present invention.

Referring now to FIG. 4, shown is a schematic diagram of an example a synchronization signal restoration module (e.g., when synchronization signal $V_{SYNC}$ is a low-frequency signal), in accordance with embodiments of the present invention. In this particular example, the synchronization signal restoration module can include comparator cmp1 that may receive signal Va and reference signal Vref, and output first synchronization signal $V_{SYNC1}$. For example, reference signal Vref can be greater than or equal to power supply voltage Vin, and less than the sum of power supply voltage Vin and the maximum value of synchronization signal $V_{SYNC}$.

Figure 5:
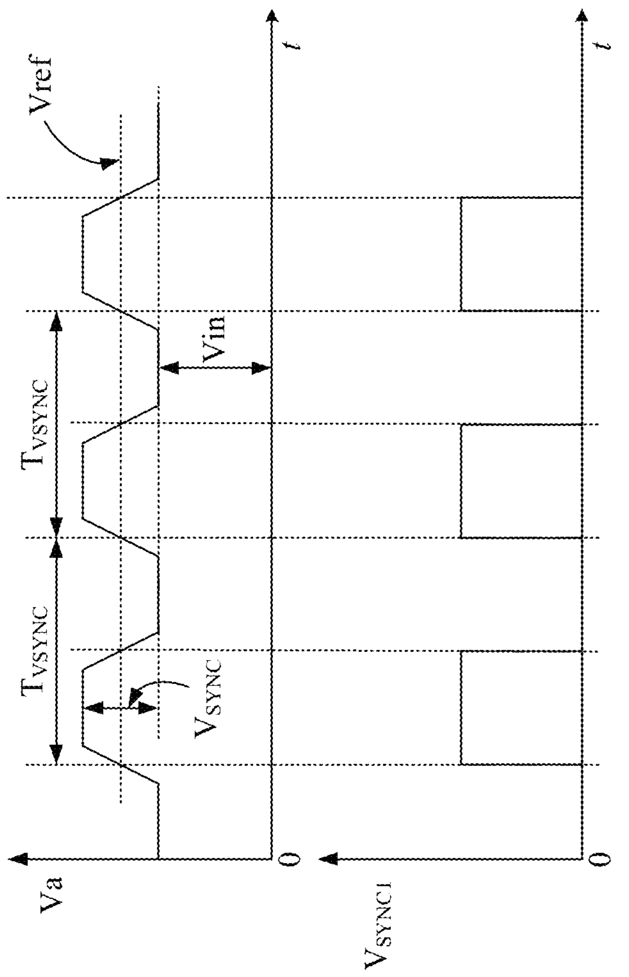
FIG. 5 is a waveform diagram of an example first signal and an example first synchronization signal, in accordance with embodiments of the present invention.

In FIGS. 4 and 5, a first input terminal of comparator cmp1 may receive signal Va. In other examples, the first input terminal of comparator cmp1 may receive the divided voltage signal of signal Va. The divided voltage signal of signal Va can be equal to k*Va, where k is less than 1 and greater than 0. Here, reference signal Vref can be greater than the divided voltage signal of power supply voltage Vin. For example, the divided voltage signal of power supply voltage Vin can be equal to k*Vin, and reference signal Vref can be less than the sum of the divided voltage signal of power supply voltage Vin and the maximum values of the divided voltage signal of synchronization signal $V_{SYNC}$, where the divided voltage signal of synchronization signal $V_{SYNC}$ can be equal to $k*V_{SYNC}$. Here, reference signal Vref can be generated according to power supply voltage Vin.

Referring now to FIG. 5, shown is a waveform diagram of an example first signal and an example first synchronization signal, in accordance with embodiments of the present invention. The operating process of the synchronization signal restoration module in FIG. 4 will be described with reference to FIG. 5. In this particular example, signal Va can be generated by superimposing a fixed power supply voltage Vin and a periodic synchronization signal $V_{SYNC}$. For example, synchronization signal $V_{SYNC}$ is a trapezoidal wave.

When signal Va is greater than reference signal Vref, first synchronization signal $V_{SYNC1}$ can be active (e.g., at a high level). When signal Va is less than reference signal Vref, first synchronization signal $V_{SYNC1}$ can be inactive (e.g., at a low level). In this way, first synchronization signal $V_{SYNC1}$ representing the synchronization signal can be obtained. For example, reference signal Vref can be greater than power supply voltage Vin. In another example, reference signal Vref can be equal to power supply voltage Vin. When synchronization signal $V_{SYNC}$ is a high-frequency signal, the synchronization signal restoration module can include a high-pass filter, whereby the input terminal of the high-pass filter may receive signal Va, and the output terminal of the high-pass filter can generate the first synchronization signal representing synchronization signal $V_{SYNC}$.

Particular embodiments may also provide a synchronization signal transmission method, which can be applied to a backlight system. The backlight system can include a master device, slave devices, and LED strings. Each slave device can drive at least one LED string, and each slave device can include a power supply port. The synchronization signal transmission method can include: injecting a synchronization signal into a power supply voltage to generate a first signal; inputting the first signal to the power supply port of each slave device, in order to simultaneously transmit the synchronization signal to each slave device; and whereby each slave device receives the first signal from the respective power supply port for synchronization operation.

The synchronization signal transmission method of particular embodiments can be applied to the backlight system including serial communication system (see, e.g., FIG. 2), and also can be applied to other backlight systems (e.g., parallel communication systems, hybrid systems, etc.). Through the synchronization signal transmission method, the synchronization signal can be injected into the power supply voltage to generate a first signal. The first signal can be input to the power supply port of each slave device, such that the synchronization signal can be transmitted to each slave device at the same time. Further, each slave device may receive the first signal from the respective power supply port for synchronization operation.

In particular embodiments, synchronization signal $V_{SYNC}$ can be used as the reference moment when the brightness of an LED string needs to be changed or when the LED brightness signal starts to take effect. For example, when the brightness of an LED string needs to be changed, the LED brightness signal can accordingly change. Also, the slave device corresponding to the LED string can change the brightness of the LED string after delaying for a first time (e.g., greater than or equal to zero) from the rising edge or falling edge of the pulse of the synchronization signal.

In particular embodiments, synchronization signal $V_{SYNC}$ can be phase-locked and frequency-doubled to generate an LED current control signal synchronized with the synchronization signal $V_{SYNC}$ to drive the LED string. For example, the slave device can generate the frequency of the LED current control signal for driving the LED string according to the frequency of the synchronization signal, in order to improve the accuracy of the LED current in one period of synchronization signal $V_{SYNC}$. For example, the frequency of the LED current control signal can be equal to the product of a first coefficient (e.g., a positive integer) and the frequency of the synchronization signal.

In particular embodiments, the synchronization signal transmission method can also include: each slave device generating a first synchronization signal according to the first signal or the divided voltage signal of the first signal received by the respective power supply port, and performing synchronization operation according to the first synchronization signal. In one example, the synchronization signal can be a periodic signal, and the period of the synchronization signal can be fixed or variable. In one example, the supply voltage can be a fixed value. In particular embodiments, the synchronization signal may be sent by a master device or an external circuit.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A synchronization signal transmission method employed by a backlight system, the backlight system comprising a master device, a plurality of slave devices, and a plurality of light-emitting diode (LED) strings, the method comprising:

a) injecting a synchronization signal into a power supply voltage, in order to generate a superimposed signal;

b) inputting the superimposed signal to a power supply port of each slave device, in order to simultaneously transmit the synchronization signal to each slave device, wherein each slave device is configured to drive at least one LED string;

c) receiving the superimposed signal from the power supply port of each slave device for synchronization operation; and wherein when a brightness of a selected LED string is to be changed, the slave device corresponding to the selected LED string changes the brightness of the selected LED string after delaying for a first time from a rising edge or a falling edge of a pulse of the synchronization signal, wherein the first time is greater than or equal to zero.

2. The method of claim 1, wherein each slave device is configured to receive a first synchronization signal representing the synchronization signal according to the superimposed signal or a divided voltage signal of the superimposed signal from the respective power supply port, and to perform synchronization operation according to the first synchronization signal.

3. The method of claim 1, wherein the synchronization signal is a periodic signal.

4. The method of claim 1, wherein the power supply voltage is a fixed value.

5. A synchronization signal transmission method employed by a backlight system, the backlight system comprising a master device, a plurality of slave devices, and a plurality of light-emitting diode (LED) strings, the method comprising:

a) injecting a synchronization signal into a power supply voltage, in order to generate a superimposed signal;

b) inputting the superimposed signal to a power supply port of each slave device, in order to simultaneously transmit the synchronization signal to each slave device, wherein each slave device is configured to drive at least one LED string;

c) receiving the superimposed signal from the power supply port of each slave device for synchronization operation;

d) wherein the slave device is configured to generate a frequency of an LED current control signal for driving an LED string according to a frequency of the synchronization signal, in order to improve an accuracy of an LED current in one period of the synchronization signal; and e) wherein the frequency of the LED current control signal is equal to a product of a first coefficient and the frequency of the synchronization signal, wherein the first coefficient is a positive integer.

6. A backlight system, comprising:

a) a plurality of light-emitting diode (LED) strings;

b) a master device and a plurality of slave devices, coupled in series in sequence;

c) wherein each slave device comprises a power supply port and is configured for driving at least one LED string, the power supply port of each slave device is configured to receive a superimposed signal generated by injecting a synchronization signal into a power supply voltage, in order to simultaneously transmit the synchronization signal to each slave device, and wherein each slave device is configured to receive the superimposed signal from the respective power supply port for synchronization operation; and d) wherein each slave device further comprises a synchronization signal restoration module configured to generate a first synchronization signal representing the synchronization signal according to the superimposed signal or a divided voltage signal of the superimposed signal from the respective power supply port, and a control module configured to receive the first synchronization signal, and to perform synchronization operation according to the first synchronization signal.

7. The backlight system of claim 6, wherein when a brightness of a selected LED string is to be changed, the slave device corresponding to the selected LED string changes the brightness of the selected LED string after delaying for a first time from a rising edge or a falling edge of a pulse of the synchronization signal, wherein the first time is greater than or equal to zero.

8. The backlight system of claim 6, wherein:

a) the slave device is configured to generate a frequency of an LED current control signal for driving an LED string according to a frequency of the synchronization signal, in order to improve the accuracy of an LED current in one period of the synchronization signal; and b) the frequency of the LED current control signal is equal to a product of a first coefficient and the frequency of the synchronization signal, wherein the first coefficient is a positive integer.

9. The backlight system of claim 6, wherein when the synchronization signal is a low-frequency signal, the synchronization signal restoration module comprises a first comparator having a first input terminal configured to receive the superimposed signal or the divided voltage signal, a second input terminal configured to receive a reference signal, and an output terminal configured to generate the first synchronization signal.

10. The backlight system of claim 6, wherein when the synchronization signal is a high-frequency signal, the synchronization signal restoration module comprises a high-pass filter, wherein the input terminal of the high-pass filter is configured to receive the superimposed signal, and the output terminal of the high-pass filter is configured to generate the first synchronization signal.

11. The backlight system of claim 6, wherein the synchronization signal is sent by the master device or an external circuit.

12. The backlight system of claim 6, wherein the synchronization signal is a periodic signal.

13. The backlight system of claim 6, wherein the power supply voltage is a fixed value.

* * * * *